(12) United States Patent
Ushigome et al.

(10) Patent No.: US 9,597,955 B2
(45) Date of Patent: Mar. 21, 2017

(54) STRUCTURE FOR FILLING SECTION OF FUEL FILLER PIPE

(71) Applicant: HONDA MOTOR CO., LTD., Minato-Ku, Tokyo (JP)

(72) Inventors: Shinichiro Ushigome, Wako (JP); Takeaki Nakajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 191 days.

(21) Appl. No.: 14/378,422

(22) PCT Filed: Feb. 20, 2013

(86) PCT No.: PCT/JP2013/054180
§ 371 (c)(1),
(2) Date: Aug. 13, 2014

(87) PCT Pub. No.: WO2013/125578
PCT Pub. Date: Aug. 29, 2013

(65) Prior Publication Data
US 2015/0001216 A1    Jan. 1, 2015

(30) Foreign Application Priority Data
Feb. 20, 2012    (JP) ................................. 2012-033606

(51) Int. Cl.
*B60K 15/04*    (2006.01)
*B60K 15/05*    (2006.01)

(52) U.S. Cl.
CPC ...... *B60K 15/04* (2013.01); *B60K 2015/0429* (2013.01); *B60K 2015/0474* (2013.01); *B60K 2015/0553* (2013.01)

(58) Field of Classification Search
USPC .................... 141/348–350; 220/86.2–86.3
See application file for complete search history.

(56) References Cited

U.S. PATENT DOCUMENTS

| | | | | |
|---|---|---|---|---|
| 5,145,081 A | * | 9/1992 | Gravino | B60K 15/05 220/86.2 |
| 5,474,048 A | * | 12/1995 | Yamazaki | F02M 25/0872 123/519 |

(Continued)

FOREIGN PATENT DOCUMENTS

| | | |
|---|---|---|
| JP | S62-113618 A | 5/1987 |
| JP | H04-031019 U | 3/1992 |

(Continued)

*Primary Examiner* — Nicolas A Arnett
(74) *Attorney, Agent, or Firm* — Carrier Blackman & Associates, P.C.; Joseph P. Carrier; Anne G. Sabourin (57) ABSTRACT

There is provided a structure for a filling section of a fuel filler pipe which communicates with and connects between a filling port for inserting a nozzle of a filling gun and a fuel tank for reserving a fuel. The fuel filler pipe includes a straight pipe section which extends from the filling port to a fuel tank side and which inclines downward relative to a horizontal direction. The straight pipe section includes a capless mechanism section including a shutter to open or close the filling port. The straight pipe section includes on the filling port side thereof an end surface which inclines relative to a cross section of the straight pipe in a direction of a main body surface of a lid section closed that is provided on a panel member of a vehicle body. This structure realizes convenience in refilling and a compact size of the adapter.

5 Claims, 5 Drawing Sheets (56) References Cited

U.S. PATENT DOCUMENTS

| | | | | |
|---|---|---|---|---|
| 5,860,460 | A * | 1/1999 | Hidano | B60K 15/04 |
| | | | | 141/286 |
| 6,000,426 | A * | 12/1999 | Tuckey | B60K 15/035 |
| | | | | 123/516 |
| 7,617,851 | B2 * | 11/2009 | Barnes | B60K 15/03504 |
| | | | | 137/588 |
| 7,967,041 | B2 * | 6/2011 | Groom | B60K 15/04 |
| | | | | 141/350 |
| 8,555,937 | B2 * | 10/2013 | Murabayashi | B60K 15/04 |
| | | | | 141/312 |
| 2006/0118202 | A1 * | 6/2006 | Barnes | B60K 15/03504 |
| | | | | 141/348 |
| 2016/0069492 | A1 * | 3/2016 | Aso | B60K 15/04 |
| | | | | 251/68 |
| 2016/0121716 | A1 * | 5/2016 | Aso | B60K 15/05 |
| | | | | 220/86.2 |

FOREIGN PATENT DOCUMENTS

| | | |
|---|---|---|
| JP | H06-022042 U | 3/1994 |
| JP | 2005-125949 A | 5/2005 |
| JP | 2009-132242 A | 6/2009 |
| JP | 2009-166821 A | 7/2009 |

* cited by examiner

PRIOR ART

STRUCTURE FOR FILLING SECTION OF FUEL FILLER PIPE

TECHNICAL FIELD

The invention relates to a structure for a filling section of a fuel filler pipe which communicates with and connects between a filling port for inserting a nozzle of a filling gun and a fuel tank for reserving a fuel.

BACKGROUND ART

In general, a vehicle such as an automobile includes a member referred to as an adapter which separates a panel member and a fuel filler pipe of a vehicle body from each other (refer to, for example, "a fuel adapter 1 in the Patent document 1" or "a bottom wall provided on a recessed portion 5 in the Patent document 2"). The adapter receives, in the vicinity of the filling port, a fuel dropped off from the nozzle of a filling gun, and keeps the fuel filler pipe from the view of a user, that is, serving as a so-called worn-portion cover.

PRIOR ART DOCUMENT

Patent Document

Patent document 1: Patent Application Laid-open No. 2005-125949
Patent document 2: Patent Application Laid-open No. 2009-166821

SUMMARY OF INVENTION

Problem to be Solved by Invention

However, the conventional adapters as shown by the Patent documents 1 and 2 each have a problem that it is difficult for the size to be compact. This is because the adapters each provide convenience when the nozzle of the filling gun is inserted, for refilling, into the filling port of the fuel filler pipe which stands obliquely upward to the filling section from the fuel tank side.

The invention is made in view of the above actual circumstances, and has an object to provide a structure for a filling section of a fuel filler pipe, which realizes convenience in refilling and renders a size of an adapter compact.

Means for Solving Problem

To achieve the object, the invention according to claim 1 provides the most primary characteristic that is a structure for a filling section of a fuel filler pipe, wherein the fuel filler pipe communicates with and connects between a filling port for inserting a nozzle of a filling gun and a fuel tank for reserving a fuel, wherein the fuel filler pipe includes a straight pipe section which extends from the filling port to a fuel tank side and which inclines downward relative to a horizontal direction, wherein the straight pipe section includes a capless mechanism section including a shutter to open or close the filling port, and wherein the straight pipe section includes on the filling port side thereof an end surface which inclines relative to a cross section of the straight pipe in a direction of a main body surface of a lid section closed that is provided on a panel member of a vehicle body.

According to the invention of claim 1, the end surface on the filling port side of the straight pipe section inclines relative to a cross section of the straight pipe in a direction of a main body surface of a lid section closed that is provided on a panel member of a vehicle body, which realizes the convenience in refilling and renders the size of the adapter compact.

The invention according to claim 2 provides a characteristic that is the structure for the filling section of the fuel filler pipe according to claim 1, wherein the end surface on the filling port side of the straight pipe section is approximately parallel with the main body surface of the lid section closed.

According to the invention of claim 2, the end surface on the filling port side of the straight pipe section is approximately parallel with the main body surface of the lid section closed, which enhances the convenience during refilling and realizes a compact size of the adapter.

The invention according to claim 3 provides a characteristic that is the structure for the filling section of the fuel filler pipe according to claim 1, wherein the end surface on the filling port side of the straight pipe section is supported with an intervening adapter which is provided between the panel member and the fuel filler pipe and which includes on a bottom surface thereof an opening portion corresponding to the filling port, wherein the adapter is formed integrally with the panel member, and wherein the bottom surface of the adapter is disposed in approximately parallel with the main body surface of the lid section while the lid section is closed.

According to the invention of claim 3, this invention employs the constitution wherein the end surface on the filling port side of the straight pipe section is supported with an intervening adapter which is provided between the panel member and the fuel filler pipe and which includes on a bottom surface thereof an opening portion corresponding to the filling port. Therefore, this invention enhances the degree of freedom of a vehicle body design for the periphery of the filling port in addition to the effect of the invention according to claim 1.

The invention according to claim 4 provides a characteristic that is the structure for the filling section of the fuel filler pipe according to claim 2, wherein the end surface on the filling port side of the straight pipe section is supported with an intervening adapter which is provided between the panel member and the fuel filler pipe and which includes on a bottom surface thereof an opening portion corresponding to the filling port, wherein the adapter is formed integrally with the panel member, and wherein the bottom surface of the adapter is disposed in approximately parallel with the main body surface of the lid section while the lid section is closed.

According to the invention of claim 4, this invention employs the constitution, wherein the end surface on the filling port side of the straight pipe section is supported with an intervening adapter which is provided between the panel member and the fuel filler pipe and which includes on a bottom surface thereof an opening portion corresponding to the filling port. Therefore, this invention enhances the degree of freedom of a vehicle body design for the periphery of the filling port in addition to the effects of the invention according to claim 2.

The invention according to claim 5 provides a characteristic that is the structure for the filling section of the fuel filler pipe according to any one of claims 1 to 4, wherein the end surface on the filling port side of the straight pipe section has an inclination direction which is set corresponding to an inclination direction of the panel member around the lid section.

According to the invention of claim 5, this invention employs the constitution, wherein the inclination direction of the end surface on the filling port side of the straight pipe section is set corresponding to an inclination direction of the panel member being around the lid section. Therefore, this invention further enhances the effect of rendering the size of the adapter compact as compared with the inventions of claims 1 to 4.

Advantageous Effects of Invention

According to the structure for the filling of the fuel filler pipe of the invention, the structure realizes the convenience in refilling and renders the size of the adapter compact.

EMBODIMENTS FOR CARRYING OUT INVENTION

The following detailed description will be given of a structure for a filling section of a fuel filler pipe according to an embodiment of the invention, with reference to the drawings.

<Summary of a Structure for a Filling Section of a Fuel Filler Pipe According to Embodiment of Invention>

Figure 1:
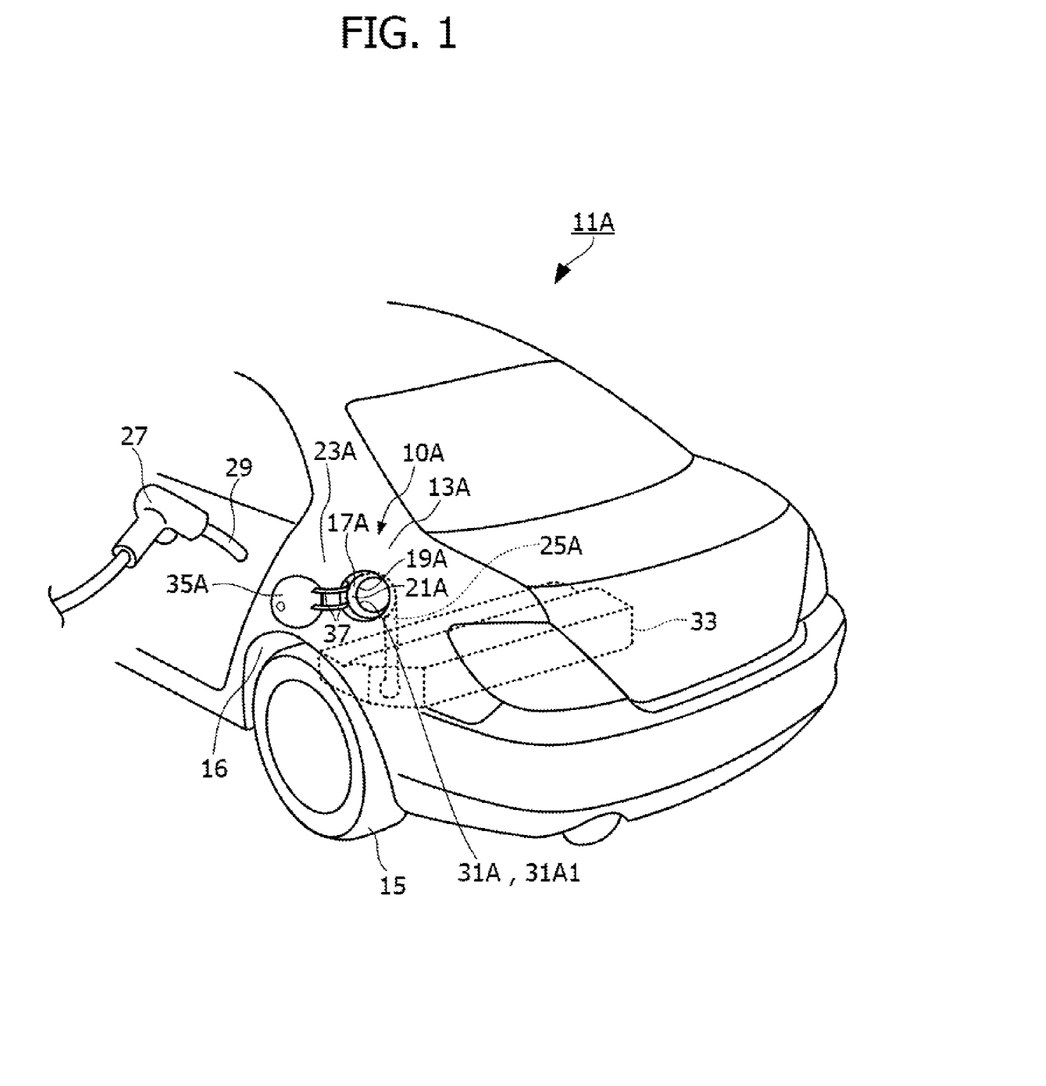
FIG. 1 is a perspective view of a vehicle having a structure for a filling section of a fuel filler pipe, as remarked on the filling section and viewed from the diagonal rear.

Firstly, the description will be given of a summary of the structure for the filling section of the fuel filler pipe according to the embodiment of the invention with reference to FIG. 1. FIG. 1 is a perspective view of a vehicle having a structure for a filling section according to the embodiment of the invention, as remarked on the filling section and viewed from the diagonal rear.

It is noted that in the descriptions of the embodiment of the invention and a comparative example, members with common function are attached with common numerals, and the redundant descriptions are omitted. In the common functional members according to the embodiment of the invention and comparative example, the functional members according to the embodiment of the invention have reference numerals attached with the following character "A", while functional members have reference numerals attached with the following character "B", if they need to be distinct from each other in view of description's convenience.

The structure for the filling section 10A of a fuel filler pipe, as illustrated in FIG. 1, is adapted to, for example, a rear fender panel 13A which is positioned on the left side of the rear portion of the vehicle body 11A. The rear fender panel 13A includes, above a rear tire 15, a concave-shaped adapter 21A which has an opening portion 19A on the bottom surface 17A. The adapter 21A with an approximately cylindrical appearance is integrally formed with a panel member 23A, and separates the panel member 23A of the vehicle body 11A and the fuel filler pipe 25A as described below from each other.

The fuel filler pipe 25A is made of a pipe member of a metal or a synthetic resin. The fuel filler pipe 25A, as illustrated in FIG. 1, communicates with and connects between an approximately circular filling port 31A for inserting the nozzle 29 of the filling gun 27 and a fuel tank 33 for reserving a fuel. The fuel filler pipe 25A has on the filling port 31A side thereof an end surface 31A1 which is supported with the intervening opening portion 19A provided on the bottom surface 17A of the adapter 21A. The fuel filler pipe 25A and the rear tire 15 are separated from each other by a wheel house 16 (refer to FIGS. 1 and 2B).

As illustrated in FIG. 1, the adapter 21A on the panel member 23A of the vehicle body 11A is set at a position, where, for example, an approximately disk-shaped lid section 35A is openably or closably fitted using a hinge section 37. The lid section 35A is kept in a closed state by a lock mechanism as not illustrated. On the other hand, the lid section 35A is disengaged by operating a release lever (not illustrated) provided in the vehicle compartment to be transited into an open state by a resilient member such as a spring under a resilient force.

<Structure for a Filling Section of a Fuel Filler Pipe According to a Comparative Example>

Figure 2A:
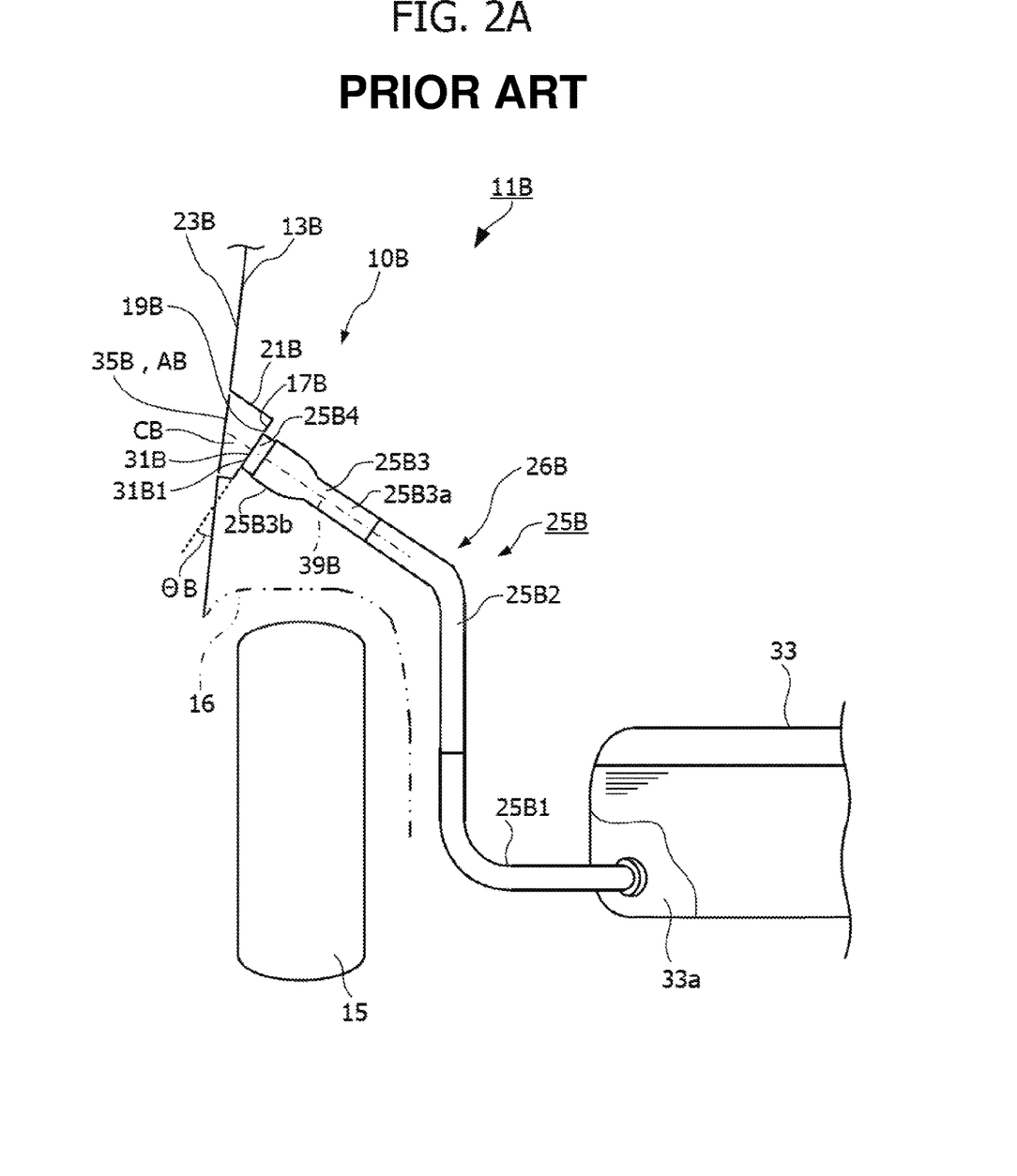
FIG. 2A is a conceptual view of the structure for the filling section of the fuel filler pipe and a structure of the peripheral portion according to a comparative example, as viewed from the rear side of the vehicle.

The following description will be given of a structure for a filling section 10B of a fuel filler pipe according to a comparative example with reference to FIG. 2A. FIG. 2A is a conceptual view of the structure for the filling section 10B of the fuel filler pipe and a structure of the peripheral portion according to the comparative example, as viewed from the rear side of the vehicle. As illustrated in FIG. 2A, the structure of the filling section 10B is adapted to, for example, a rear fender panel 13B positioned on the left side of the rear portion of the vehicle body 11B, as well as the structure for the filling section 10A of the fuel filler pipe according to the embodiment of the invention.

The fuel filler pipe 25B according to the comparative example, as illustrated in FIG. 2A, includes an approximately L-shaped first pipe section 25B1 which communicates and connects with the side wall 33a of the fuel tank 33, an approximately V-shaped second pipe section 25B2 which communicates and connects with the upper end side of the first pipe section 25B1, a third pipe section 25B3 which communicates and connects with the upper end side of the second pipe section 25B2, and an approximately cylindrical fourth pipe section 25B4 which communicates and connects with a large diameter section 25B3b (described below) of the third pipe section 25B3.

The fourth pipe section 25B4, as illustrated in FIG. 2A, has on the filling port 31B side thereof an end surface 31B1 which is supported with an intervening opening portion 19B provided on the bottom surface 17B of the adapter 21B. The filling port 31B faces diagonally upward and is directed to the outside of the vehicle body 11B. This filling port 31B has the nozzle 29 of the filling gun 27 (refer to FIG. 1) to be inserted thereinto. The fourth pipe section 25B4 has on the filling port 31B side thereof an end surface 31B1 which is disposed in approximately parallel with the cross section approximately orthogonal to the axial direction 39B of the straight pipe section 26B as described below.

The fourth pipe section 25B4, the third pipe section 25B3 and the filling port 31B side of the second pipe section 25B2 construct the straight pipe section 26B. The straight pipe section 26B, as illustrated in FIG. 2A, extends approximately straight from the filling port 31B toward the fuel tank 33 side and inclines downward relative to the horizontal direction. The third pipe section 25B3 includes a small diameter section 25B3a on the fuel tank 33 side; and a large diameter section 25B3b on the filling port 31B side. The sections 25B3a and 25B3b are continuously formed in such a manner that they gradually increase in diameter from the fuel tank 33 side toward the filling port side 31B side. The fourth pipe section 25B4 includes a capless mechanism section (not illustrated) which includes a shutter (not illustrated) and a hinge section (not illustrated) to open or close the filling port 31B.

As illustrated in FIG. 2A, the adapter 21B according to the comparative example has the nozzle 29 of the filling gun 27 (refer to FIG. 1) that comes close to the adapter 21B in an axial direction 39B of the straight pipe section 26B during refilling. This relation makes a capacity CB of the adapter 21B set to be larger (capacity of the portion defined by the inner circumferential surface of the adapter 21B and the inside surface of the lid section 35B). This makes the area AB of the lid section 35B set to be larger. The end surface 31B1 on the filling port 31B side of the fourth pipe section 25B4 and the main body surface of the closed lid section 35B are arranged in such a manner that they cross at a predetermined inclination angle of θB (refer to FIG. 2A).

<Structure for a Filling Section 10A of a Fuel Filler Pipe According to an Embodiment of the Invention>

Figure 2B:
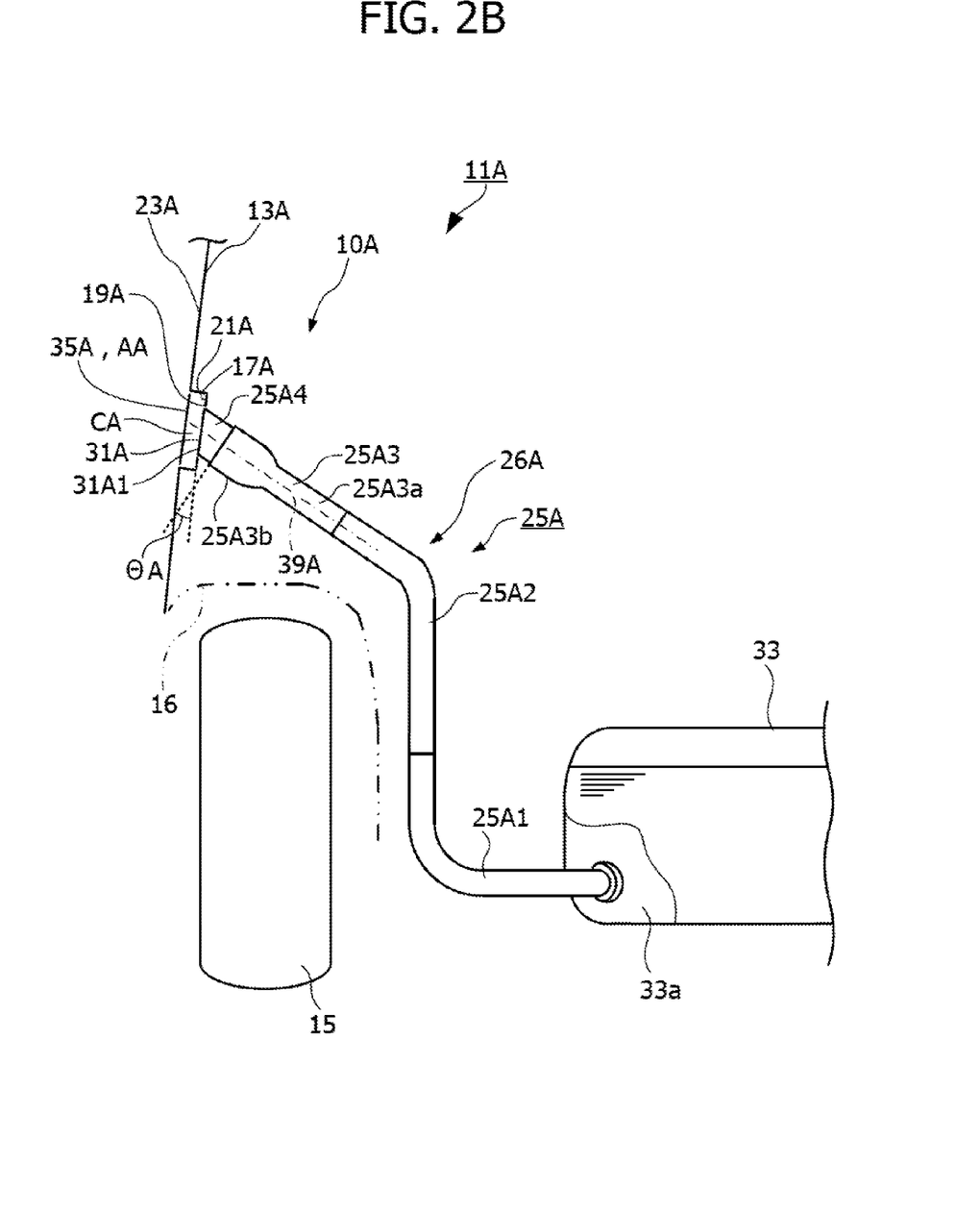
FIG. 2B is a conceptual view of the structure for the filling section of the fuel filler pipe and a structure of the peripheral portion according to an embodiment of the invention, as viewed from the rear side of the vehicle.
Figure 3A:
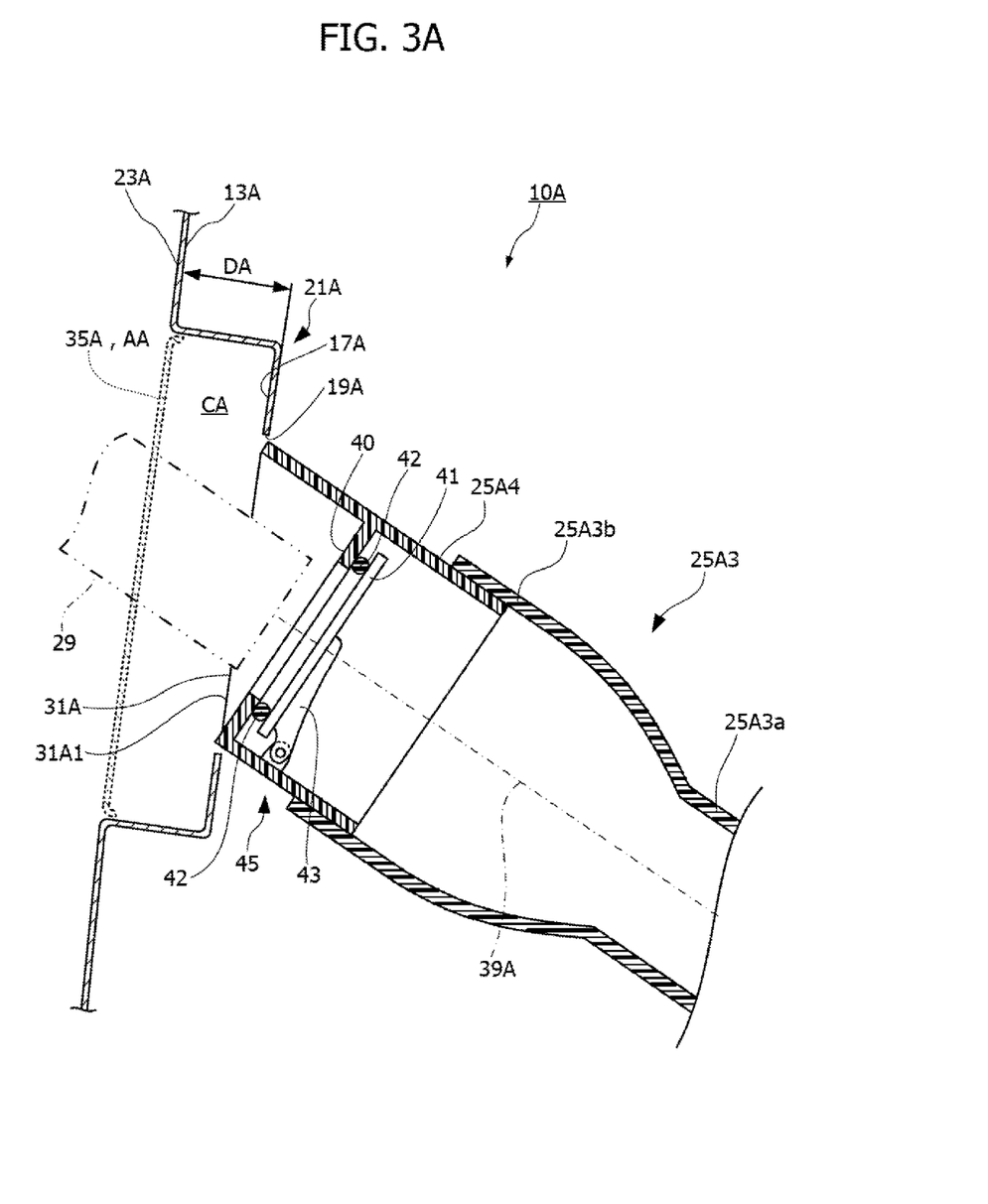
FIG. 3A is an enlarged illustrative view of the structure for the filling section of the fuel filler pipe with a nozzle of a filling gun (before being inserted).
Figure 3B:
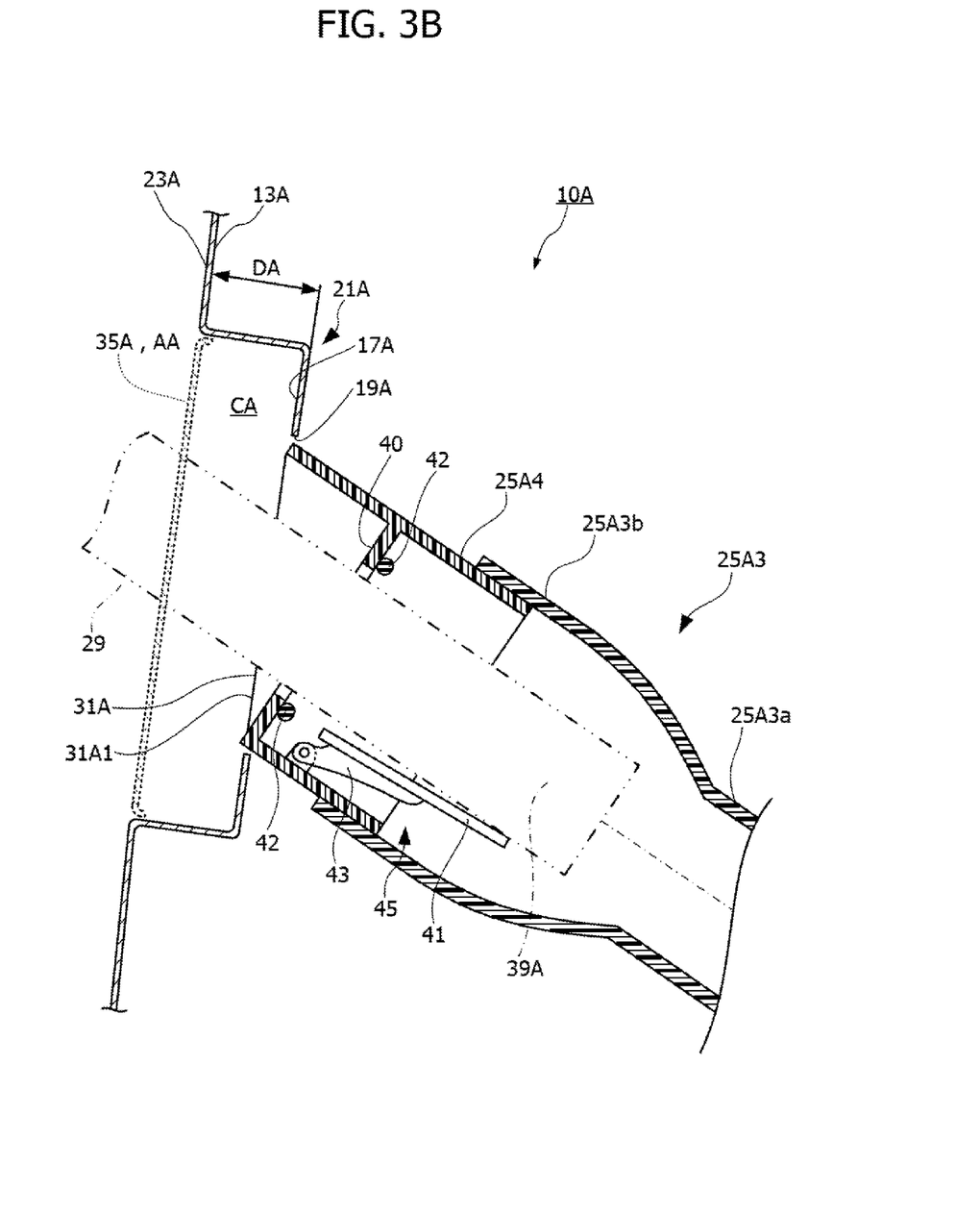
FIG. 3B is an enlarged illustrative view of the structure for the filling section of the fuel filler pipe as illustrated in FIG. 2B with a nozzle of a filling gun (after being inserted).

The following description will be given of the structure for the filling section 10A of the fuel filler pipe according to the embodiment of the invention with reference to FIGS. 2B, 3A and 3B. FIG. 2B is a conceptual view of the structure for the filling section 10A of the fuel filler pipe according to the embodiment of the invention and the structure of the peripheral portion as viewed from the rear side of the vehicle. FIGS. 3A and 3B are enlarged illustrative views of the structure for the filling section 10A of the fuel filler pipe as illustrated in FIG. 2B with the nozzle 29 of the filling gun 27 (FIG. 3A represents them before being inserted and FIG. 3B represents them after being inserted).

The fuel filler pipe 25A according to the embodiment of the invention, as illustrated in FIG. 2B, includes an approximately L-shaped first pipe section 25A1 which communicates and connect with the side wall 33a of the fuel tank 33; an approximately V-shaped second pipe section 25A2 which communicates and connects with the upper end side of the first pipe section 25A1; a third pipe section 25A3 which communicates and connects with the upper end side of the second pipe section 25A2; and a fourth pipe section 25A4 of an irregular shape which communicates and connects with a large diameter section 25A3b of the third pipe section 25A3 (described below). It is noted that the fourth pipe section 25A4 will be occasionally referred to as "a bracket" in the following description.

The bracket (fourth pipe section) 25A4 has on the filling port 31A side thereof an end surface 31A1 which, as illustrated in FIGS. 2B, 3A and 3B, is supported with the intervening opening portion 19A provided on the bottom surface 17A of the adapter 21A. To be specific, the end surface 31A1 on the filling port 31A side of the bracket 25A4 is fittingly supported, for example, with the intervening circular-ring shaped seal ring (not illustrated) provided on the opening portion 19A. The filling port 31A faces obliquely upward and is directed to the outside of the vehicle body 11A. This filling port 31A has the nozzle 29 (refer to FIGS. 1, 3A and 3B) of the filling gun 27 to be inserted thereinto.

Herein, the remarked point is that the bracket (fourth pipe section) 25A4 is formed in an irregular shape. That is, in the comparative example as illustrated in FIG. 2A, the end surface 31B1 on the filling port 31B side of the fourth pipe section 25B4 is disposed in approximately parallel with the cross section approximately orthogonal to the axial direction 39B of the straight pipe section 26B. On the other hand, in the embodiment of the invention as shown in FIG. 2B, the end surface 31A1 on the filling port 31A side of the bracket (fourth pipe section) 25A4 is disposed in such a manner that the end surface 31A1 crosses the axial direction 39A of the straight pipe section 26A at an inclination angle θA relative to the cross section approximately orthogonal to the axial direction 39A of the straight pipe section 26A.

Therefore, the end surface 31A1 on the filling port 31A side of the bracket (fourth pipe section) 25A4 is disposed in approximately parallel with the bottom surface 17A of the adapter 21A and the inner surface of the lid section 35A. This results in decrease of the surface area AA of the lid section 35A and the depth-directional dimension DA of the adapter 21A (refer to FIGS. 3A and 3B), which renders the volume CA of the adapter 21A compact.

The bracket (fourth pipe section) 25A4, the third pipe section 25A3, and a portion on the filling port 31A of the second pipe section 25A2 construct the straight pipe section 26A. As shown in FIG. 2B, the straight pipe section 26A is inclined downward relative to the horizontal direction from the filling port 31A toward the fuel tank 33 side and extends approximately straight. The third pipe section 25A3 includes a small diameter section 25A3a on the fuel tank 33 side, and a large diameter section 25A3b on the filling port 33 side. These sections 25A3a and 25A3b are continuously formed as they gradually increases in diameter from the fuel tank 33 side toward the filling port 31A side.

The bracket (fourth pipe section) 25A4 of an irregular shape, as illustrated in FIGS. 3A and 3B, is constructed with a flange section 40 projectingly formed on the inner circumferential surface of the bracket 25A4, a capless mechanism section 45 which includes a shutter 41, a hinge section 43 and the like to open or close the filling port 31A (flange section 40). The disk-shaped shutter 41 is provided openably and closably using the hinge section 43 with the outer peripheral portion urged in the direction of coming in contact with the flange portion 40 (close direction).

The capless mechanism section 45 prevents a fuel reserved in the fuel tank 33 from vaporizing during a normal time except for a refilling time without using a filler cap which needs to open or close with a rotation operation by a hand operation. The capless mechanism section 45 has a function which has the fuel filler channel open during a refilling time for smoothly supplying a fuel. To sufficiently perform this function, the flange section 40 has a circumferential portion on which the outer peripheral portion of the shutter 41 abuts and which is provided with a circular-ring shaped seal ring 42.

As illustrated in FIGS. 3A and 3B, the capless mechanism section 45 is operated in such a manner that when the lid section 35A is made open and the nozzle 29 of the filling gun 27 is inserted into the straight pipe section 26A of the fuel filler pipe 25A from the filling port 31A, the shutter 41 is pushed by the nozzle 29 to be opened. This operation makes it possible to smoothly supply a fuel from the filling port 31A to the fuel tank 33 through the fuel filler pipe 25A.

In the above-described constructed adapter 21A according to the embodiment of the invention as illustrated in FIGS. 3A and 3B, as if the nozzle 29 of the filing gun 27 is inserted into the fuel filler pipe 25A along the axis 39A of the straight pipe section 26A during a refilling time, the nozzle 29 of the filling gun 27 is prevented from abutting against the vehicle body 13A whenever possible. This is because, in the embodiment of the invention as compared with the comparative example, the surface area AA of the lid section 35A and the depth-directional dimension DA of the adapter 21A (refer to FIGS. 3A and 3B) decreases, which renders the volume CA of the adapter 21A compact.

It is preferable that the inclination direction of the end surface 31A1 on the filling port 31A side of the straight pipe section 26A is set corresponding to the inclination direction of the panel member 23A disposed on the circumference of the lid section 35A. This is because the volume CA of the adapter 21A is made further compact.

<Operation and Effect of the Structure for the Filling Section 10A of the Fuel Filler Pipe According to Embodiment of the Invention>

The structure for the filling section 10A of the fuel filler pipe according to the embodiment of the invention is a structure for the filling section of the fuel filler pipe 25A which communicates with and connects between the filling port 31A for inserting the nozzle 29 of the filling gun 27 and the fuel tank 33 for reserving the fuel. In the structure for the filling section 10A of the fuel filler pipe according to the embodiment of the invention, the fuel filler pipe 25A includes a straight pipe section 26A which inclines and extends downward relative to the horizontal direction from the filling port 31A toward the fuel tank 33A side. The straight pipe section 26A includes a capless mechanism section 45 provided with a shutter 41 for opening or closing the filling port 31A. The end surface 31A1 on the filling port 31A side of the straight pipe section 26A is inclined relative to the cross section of the straight pipe section 26A in a direction of a main body surface during closing of the lid section 35A provided on the panel member 23A of the vehicle body 13A.

According to the structure for the filling section 10A of the fuel filler pipe of the invention, the end surface 31A1 on the filling port 31A side of the straight pipe section 26A is inclined relative to the cross section of the straight pipe section 26A in a direction of the main body surface during closing of the lid section 35A provided on the panel member 23A of the vehicle body 13A. This structure decreases the surface area AA of the lid section 35A and the depth-directional dimension DA of the adapter 21A (refer to FIGS. 3A and 3B), which renders the volume CA of the adapter 21A compact.

The compact volume CA of the adapter 21A reduces weight of and costs for the structure for the filling section 10A of the fuel filler pipe. The compact volume CA of the adapter 21A reduces a projecting amount of the adapter 21A into the vehicle compartment. This result in expectation on effects of enlarging, for example, a trunk room space, a vehicle compartment space and the like. This result precisely prevents the nozzle 29 of the filling gun 27 from interfering with the vehicle body 13A during refilling.

Decrease of the surface area AA of the lid section 35A reduces the weight of and costs for the lid section 35A. The area decrease of the lid section 35A enhances quality of appearance on the vehicle at the periphery of the lid section 35A.

The fuel filler pipe 25A employs a structure having the straight pipe section 26A which inclines downward relative to the horizontal direction and extends from the filling port 31A to the fuel tank 33 side. This structure easily avoids the wheel house 16 (refer to FIGS. 1 and 2B).

According to the conventional structure for the filling section of the fuel filler pipe of cap type, it is difficult for a cap to be fitted with the end surface on the filling port side of the fuel filler structure, unless the end surface is normal to the axial direction. On the contrary, according to the embodiment of the invention having the capless mechanism section 45 having the straight pipe section 26A provided with the shutter 41 for opening or closing the filling port 31A, consideration for fitting a cap is not necessary. Therefore, the embodiment of the invention eliminates restriction that the end surface on the filling port side of the filling filler pipe is made normal to the axial direction.

The embodiment of the invention employs the construction, in which the end surface 31A1 on the 31A side of the straight pipe section 26A is inclined relative to the cross section of the straight pipe section 26A in a direction of a main body surface of the closed lid section 35A provided on the panel member 23A of the vehicle body 13A. This construction makes it difficult for the filling gun 27 to abut against the panel member 23A of the vehicle body 13A during refilling. Therefore, the structure for the filling section 10A of the fuel filler pipe according to the embodiment of the invention performs refilling without damaging the vehicle body A in addition to the above-described enhancement of convenience during refilling and the compact size of the adapter.

According to the structure for the filling section 10A of the fuel filler pipe according to the embodiment of the invention, the end surface 31A1 on the filling port 31A of the straight pipe section 26A is approximately parallel with the main body surface of the closed lid section, which realizes further enhancement of convenience during refilling and the compact size of the adapter.

According to the structure for the filling section 10A of the fuel filler pipe according to the embodiment of the invention, the end surface 31A1 on the filling port 31A of the straight pipe section 26A is provided between the panel member 23A and the fuel filler pipe 25A and is supported with the intervening adapter 21A having on the bottom surface 17A the opening portion 19A corresponding to the filling port 31A. The adapter 21A is integrally formed with the panel member 23A. The bottom surface 17A of the adapter 21A is provided in approximately parallel with the main body surface of the lid section 35A while the lid section 35A is closed.

The structure for the filling section 10A of the fuel filler pipe according to the embodiment of the invention employs the construction in which the end surface 31A1 on the filling port 31A of the straight pipe section 26A is supported with the intervening adapter 21A of a compact size which is disposed between the panel member 23A and the fuel filler pipe 25A and has the bottom surface 17A of the opening portion 19A. This construction enhances the degree of freedom of a vehicle body design around the filling port 31A.

The construction is employed, in which the adapter 21A is formed integrally with the panel member 23A. This construction reduces the number of parts, which serves as simplification of production processes and reduction of production costs.

The construction is employed, in which the bottom surface 17A of the adapter 21A is disposed in approximately parallel with the main body surface of the closed lid 35A. This construction has the filling port 31A come close to the main body surface of the lid section 35A, and thereby renders the adapter 21A further compact.

The structure for the filling section 10A of the fuel filler pipe according to the embodiment of the invention may employ the construction, in which the inclination direction of the end surface 31A1 on the filling port 31A of the straight pipe section 26A is set corresponding to the direction of the inclination of the panel member 23A disposed around the lid section 35A.

According to this construction, for example, the inclination direction of the panel member 23A disposed around the lid section 35A, as illustrated in FIG. 2B, is set in such a manner that the upper side is slightly inclined inward of the vehicle relative to the vertical direction as viewed from the rear side of the vehicle. In this case, the inclination direction of the end surface 31A1 on the filling port 31A side of the straight pipe section 26A is set corresponding to the inclination direction of the panel member 23A. This construction further enhances the effect of rendering the volume CA of the adapter 21A compact.

Other Embodiment

The above-described embodiments are concrete examples of the invention. Therefore, the technical scope of the invention shall not be limitedly constructed by these embodiments. This is because the invention is carried out with various embodiments without departing from the gist and primary feature.

For example, in the description according to the embodiment of the invention, though the description is given of the example of the fuel filler pipe 25A constructed of the four first to fourth pipes, the invention is not limited to this example. The separation number of the fuel filler pipe 25A may be properly set to an arbitrary number without departing the scope of the gist according to the invention.

In the description according to the embodiment of the invention, though the description is given of the example of the lid section 35A provided on the rear fender panel 13A positioned on the left side of the rear portion of the vehicle body 11A, the invention is not limited to this example. The set position of the lid section 35A is properly set at an arbitrary position without departing the scope of the gist according to the invention.

In the description according to the embodiment of the invention, though the shape of the lid section 35A is described of the example of a disc-shape, the invention is not limited to this example. The shape of the lid section 35A is properly set to an arbitrary shape without departing from the scope of the gist according to the invention.

In the description according to the embodiment of the invention, though the appearance shape of the adapter 21A is described of the example employing a cylindrical shape, the invention is not limited to this example. The appearance shape of the adapter 21A is properly set to an arbitrary shape without departing from the scope of the gist according to the invention.

DESCRIPTION OF REFERENCE NUMERALS

10A: Structure for filling section of fuel filler pipe according to an embodiment of the invention
11A: Vehicle body
13A: Rear fender panel
15: Rear tire
16: Wheel house
17A: Bottom surface of adapter
19A: Opening portion of adapter
21A: Adapter
23A: Panel member of vehicle body
25A: Fuel filler pipe
25A1: First pipe section
25A2: Second pipe section
25A3: Third pipe section
25A4: Fourth pipe section (Bracket)
26A: Straight pipe section
27: Filling gun
29: Nozzle
31A: Filling port
31A1: End surface of filling port side
33: Fuel tank
35A: Lid section
37: Hinge section
39A: Axial direction of straight pipe section
40: Flange section
41: Shutter
42: Seal ring
43: Hinge section
45: Capless mechanism section

The invention claimed is:

1. A structure for a filling section of a fuel filler pipe, comprising:
   a fuel filler pipe communicating with and connecting between a filling port into which a nozzle of a filling gun is inserted, and a fuel tank for reserving a fuel; and
   an adapter disposed between a panel member of a vehicle body and the fuel filler pipe and including a bottom surface defining the filling port,
   wherein the fuel filler pipe includes a straight pipe section which extends from the filling port to a fuel tank side and which inclines downward relative to a horizontal direction,
   wherein the straight pipe section includes a capless mechanism section including a shutter to open or close the filling port, and
   wherein the straight pipe section includes an end surface proximate to the filling port, and has a cross section which is formed if the straight pipe section is cut approximately orthogonally to an axial direction of the straight pipe section,
   wherein the end surface of the straight pipe section is connected to the filling port of the adapter,
   wherein the end surface of the straight pipe section inclines relative to the cross section of the straight pipe section toward a main body surface of a closed lid section that is provided on the panel member of the vehicle body,
   wherein the end surface of the straight pipe section is disposed approximately parallel with the main body surface of the closed lid section, and
   wherein the end surface of the straight pipe section is disposed at an inclination relative to a vertical direction which is smaller as compared with that of the cross section of the straight pipe section.

2. The structure for the filling section of the fuel filler pipe according to claim 1,
   wherein the filling port side of the straight pipe section is provided with a bracket including the capless mechanism section,
   wherein the bracket has on a filling port side thereof an end surface which serves as the end surface on the filling port side of the straight pipe section, and wherein the bracket has on a fuel tank side thereof an end surface which is disposed approximately parallel with the cross section of the straight pipe section.

3. The structure for the filling section of the fuel filler pipe according to claim 2,
wherein the adapter is formed integrally with the panel member, and
wherein the bottom surface of the adapter is disposed approximately parallel with the main body surface of the lid section while the lid section is closed.

4. The structure for the filling section of the fuel filler pipe according to claim 1,
wherein the adapter is formed integrally with the panel member, and
wherein the bottom surface of the adapter is disposed approximately parallel with the main body surface of the lid section while the lid section is closed.

5. The structure for the filling section of the fuel filler pipe according to claim 1, wherein the end surface on the filling port side of the straight pipe section has an inclination direction which is set corresponding to an inclination direction of the panel member being around the lid section.

* * * * *